(12) United States Patent
McKigney et al.

(10) Patent No.: US 7,679,060 B2
(45) Date of Patent: Mar. 16, 2010

(54) NANOPHOSPHOR COMPOSITE SCINTILLATOR WITH A LIQUID MATRIX

(75) Inventors: Edward Allen McKigney, Los Alamos, NM (US); Anthony Keiran Burrell, Los Alamos, NM (US); Bryan L. Bennett, Los Alamos, NM (US); David Wayne Cooke, Santa Fe, NM (US); Kevin Curtis Ott, Los Alamos, NM (US); Minesh Kantilal Bacrania, Los Alamos, NM (US); Rico Emilio Del Sesto, Los Alamos, NM (US); Robert David Gilbertson, Los Alamos, NM (US); Ross Edward Muenchausen, Los Alamos, NM (US); Thomas Mark McCleskey, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 11/924,136

(22) Filed: Oct. 25, 2007

(65) Prior Publication Data

US 2008/0191168 A1      Aug. 14, 2008

Related U.S. Application Data

(63) Continuation-in-part of application No. 11/729,073, filed on Mar. 27, 2007, which is a continuation-in-part of application No. 11/644,246, filed on Dec. 21, 2006.

(60) Provisional application No. 60/786,581, filed on Mar. 27, 2006, provisional application No. 60/752,981, filed on Dec. 21, 2005.

(51) Int. Cl.
    *G01T 1/20*      (2006.01)
(52) U.S. Cl. .................................. 250/361 R
(58) Field of Classification Search ............. 250/361 R
    See application file for complete search history.

(56) References Cited

U.S. PATENT DOCUMENTS

| 5,952,665 | A * | 9/1999 | Bhargava ................. 250/483.1 |
| 6,565,973 | B2 * | 5/2003 | Duff et al. .................... 428/402 |
| 6,855,270 | B2 * | 2/2005 | Mumper et al. ........ 252/301.17 |
| 7,145,149 | B2 | 12/2006 | Cooke et al. |
| 7,404,928 | B2 * | 7/2008 | Foos et al. ............... 422/82.02 |
| 2005/0161611 | A1 * | 7/2005 | Disdier et al. .......... 250/370.11 |

OTHER PUBLICATIONS

M. Boulay, et al., "A Letter Expressing Interest in Staging an Experiment at SNOLAB Involving Filling SNO with Liquid Scintillator Plus Double Beta Decay Candidate Isotopes." Apr. 9, 2004. [retrieved on Apr. 9, 2009 from <http://snoplus.phy.queensu.ca/LOI.pdf>].*

* cited by examiner

*Primary Examiner*—Constantine Hannaher
(74) *Attorney, Agent, or Firm*—Husch Blackwell Sanders LLP; Samuel L. Borkowsky

(57) ABSTRACT

An improved nanophosphor scintillator liquid comprises nanophosphor particles in a liquid matrix. The nanophosphor particles are optionally surface modified with an organic ligand. The surface modified nanophosphor particle is essentially surface charge neutral, thereby preventing agglomeration of the nanophosphor particles during dispersion in a liquid scintillator matrix. The improved nanophosphor scintillator liquid may be used in any conventional liquid scintillator application, including in a radiation detector.

23 Claims, No Drawings

NANOPHOSPHOR COMPOSITE SCINTILLATOR WITH A LIQUID MATRIX

CROSS-REFERENCE TO RELATED APPLICATIONS

This application is a continuation-in-part of U.S. patent application Ser. No. 11/729,073 filed Mar. 27, 2007 entitled "Nanocomposite Scintillator, Detector, and Method," which is a continuation-in-part of U.S. patent application Ser. No. 11/644,246 filed Dec. 21, 2006 entitled "Nanocomposite Scintillator, Detector, and Method," and claims the benefit of U.S. Provisional Patent Application Ser. No. 60/786,581 filed Mar. 27, 2006 entitled "Nanocomposite Scintillator, Detector and Method," and U.S. Provisional Patent Application Ser. No. 60/752,981 filed Dec. 21, 2005 entitled "Nanocomposite Scintillator and Detector," all hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF INVENTION

Phosphors are currently used in many important devices such as fluorescent lamps, lasers and crystal scintillators for radiation detectors, radiographic imaging and nuclear spectroscopy. An important property of any phosphor is its brightness, or quantum efficiency, which is the ratio of the number of photons emitted by the phosphor to the number of photons absorbed. Other important properties include the spectral region of maximum emission, optical absorption, emission decay time and density. Phosphors may be categorized as either intrinsic, where the luminescence is generated by the host material, or extrinsic, where impurities or dopants in the host material generate the luminescence.

In general, superior scintillators exhibit high quantum efficiency, good linearity of spectral emission with respect to incident energy, high density, fast decay time, minimal self-absorption, and high effective Z-number (the probability of photoelectric absorption is approximately proportional to $Z^5$.) Specific scintillator applications determine the choice of phosphor. For example, scintillators used for active and passive radiation detection require high density and brightness, whereas scintillators used for radiographic imaging also require fast decay time.

Pending U.S. patent application Ser. No. 11/644,246, which shares a common assignee with the instant application, discloses novel nanophosphor composite scintillators utilizing a solid matrix or binder. The application notes that agglomeration of the nanophosphor particles may be caused by Van der Waals type or Coulomb type attraction between the particles, leading to non-uniform distribution of the nanophosphors. To prevent or minimize agglomeration, charge may be added or subtracted from the nanoparticle surface by adjusting the pH. Alternatively, surfactants may be added to the matrix to decrease agglomeration. However, neither of these approaches fully avoids agglomeration of the nanoparticles. Liquid scintillators are not disclosed.

Liquid scintillators are known in the art, but are limited by the quality of phosphor, and are subject to incomplete dispersion of the phosphor in the liquid. Conventional liquid scintillators are available, for example, from Saint-Gobain/Bicron and Eljen Technologies, Inc. However, none of the prior art liquid scintillators are loaded with high Z material suitable for applications such as gamma ray spectroscopy.

There is therefore a need for improved liquid scintillators and methods of producing liquid scintillators that prevents agglomeration at high volume loadings to produce uniform distributions of phosphor throughout the liquid.

SUMMARY OF INVENTION

An illustrative aspect of the present invention is a nanophosphor scintillator liquid comprising liquid matrix and at least one nanophosphor particle. The nanophosphor particle is selected from the group consisting of yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide.

Another illustrative aspect of the present invention is a nanophosphor scintillator liquid comprising a liquid matrix and at least one surface modified nanophosphor particle capped with an organic ligand.

Yet another illustrative aspect of the present invention is a method of radiation detection comprising exposing the nanophosphor scintillator liquid to a radiation source, and detecting luminescence from the nanophosphor scintillator liquid.

Still another illustrative aspect of the present invention is a radiation detector comprising the nanophosphor scintillator liquid and a photo detector optically coupled to the nanophosphor scintillator liquid.

DETAILED DESCRIPTION

There are provided novel compositions comprising nanophosphor particles in a liquid matrix, a method of detecting radiation and a detector utilizing the novel composition. The nanophosphor scintillator liquid is prepared by using nanophosphors of fast, bright, dense scintillators. The brightness provides a detector with optimum light detection, and the high density provides the detector with stopping power for radiation emitters such as x-rays, gamma-rays, neutrons, protons. The nanophosphor particles are optionally surface modified by capping with an organic ligand prior to being dissolved in a liquid matrix. The nanophosphor scintillator liquid of the present invention is inexpensive to prepare compared to the cost of preparing conventional scintillator liquids.

Suitable liquid matrixes are transparent to light in the specific phosphor's emission region. Further, if the nanophosphor is capped, the liquid matrix must be miscible in, or at a minimum a good solvent for, the specific organic ligand used to cap the nanophosphor particle. Preferred liquid matrixes have melting points below room temperature, boiling points above about 60° C., and may have an index of refraction that closely matches the index of refraction of the phosphor. The liquid matrix may be a scintillating liquid matrix or a non-scintillating liquid matrix. Suitable scintillating liquid matrixes include those selected from the group consisting of benzene, toluene, xylene analogs, deuterated analogs, mineral oil, halogenated solvents, and mixtures thereof.

Suitable non-scintillating liquid matrixes include those selected from the group consisting of linear alkanes, cyclic alkanes, linear alkenes and cyclic alkenes, such as hexane, cyclohexane, and octadecene: ethers such as dietyl ether and diphenyl ether; halogented solvents such as methylene chloride and chloroform; alcohols and phenols, such as polyethylene glycol; amines such as hexadecylamine and dimethylformamide; and mixtures thereof.

The liquid matrix material may be loaded with about 0.1-2 wt. % primary wavelength shifters such as p-terphenyl and 2,5-diphenyloxazole (PPO), and/or secondary wavelength shifters such as 1,4-bis(5-phenyloxazol-2-yl)benzene (POPOP) and 3HF; or about 2-80% wt. anthracene, naphthalene or stilbene. Additives such as naturally occurring or isotopically enhanced B or Gd may be added for neutron detection.

Nanophosphors of the present invention may be intrinsic phosphors or extrinsic phosphors. Intrinsic phosphors are phosphors that do not include a dopant in order to produce luminescence. Extrinsic phosphors include a dopant to produce luminescence. Nonlimiting examples of intrinsic phosphors include yttrium oxide, yttrium tantalite, barium fluoride, cesium fluoride, bismuth germinate, zinc gallate, calcium magnesium pyrosilicate, calcium molybdate, calcium chlorovanadate, barium titanium pyrophosphate, metal tungstate and lanthanide halides. Non-limiting examples of extrinsic phosphors include cerium doped nanophosphors, bismuth doped nanophosphors, lead doped nanophosphors, thallium doped sodium iodide, doped cesium iodide and rare earth doped tyrosilicates. Illustrative, non-limiting examples of specific suitable phosphors are given below.

Metal tungstate may be lead tungstate, zinc tungstate, calcium tungstate, magnesium tungstate or cadmium tungstate.

Cerium doped nanophosphor may be a cerium doped oxyorthosilicate; a formula $LAX_3$:Ce wherein X is at least one halide; a cerium doped lanthanum halosilicate of a formula $LaSiO_3$:Ce wherein X is at least one halide; an alkaline earth fluoride of a formula $MF_2$:Ce wherein M is at least one alkaline earth metal selected from the group consisting of barium, calcium, strontium and magnesium; an alkaline earth sulfate of a formula $MSO_4$:Ce wherein M is at least one alkaline earth chosen from barium, calcium, and strontium; an alkaline earth thiogallate of a formula $MGa_2S_4$:Ce wherein M is at least one alkaline earth chosen from barium, calcium, strontium and magnesium; alkaline earth aluminates of a formula $LMAl_{10}O_{17}$:Ce and $CeLMAl_{11}O_8$:Ce wherein L, M are at least two alkaline earth metal chosen from barium, calcium, strontium and magnesium; alkaline earth pyrosilicates of a formula $L_2MSi_2O_7$:Ce wherein L, M are at least two alkaline earth chosen from calcium and magnesium; a cerium doped metal aluminum perovskite $MAlO_3$:Ce wherein M is at least one metal chosen from yttrium and lutetium; a cerium doped alkaline earth sulphide of formula MS:Ce wherein M is at least one alkaline earth chosen from strontium and magnesium; a cerium doped yttrium borate; a cerium doped yttrium aluminum borate; a cerium doped yttrium aluminum garnet; a cerium doped yttrium oxychloride; a cerium doped calcium silicate; a cerium doped calcium aluminum silicate, a cerium doped yttirum phosphate, a cerium doped calcium aluminate, a cerium doped calcium pyroaluminate, a cerium doped calcium phosphate, a cerium doped calcium pyrophosphate, or a cerium doped lanthanum phosphate.

Bismuth doped nanophosphors include a host lattice selected from the group consisting of an alkaline earth phosphate of a formula $LM_2(P)_4)_2$:Bi wherein M is at least one alkaline earth chosen from barium, calcium and strontium; a lanthanide metal oxide of a formula $M_2O_3$:Bi wherein M is at least one metal chosen from yttrium and lanthanum; a bismuth doped yttrium aluminum borate; a bismuth doped lanthanum oxychloride; a bismuth doped zinc oxide; a bismuth doped calcium oxide; a bismuth doped calcium titanium aluminate; a bismuth doped calcium sulphide; a bismuth doped strontium sulphate; or a bismuth doped gadolinium niobate.

Lead doped nanophosphor is selected from alkaline earth sulfates of formula $MSO_4$:Pb wherein M is at least one alkaline earth chosen from calcium and magnesium; alkaline earth borates of formula $MB_4O_7$:Pb and $MB_2O_4$:Pb wherein M is at least one alkaline earth chosen from calcium and strontium; an alkaline earth chloroborate of a formula $M_2B_5O_9Cl$:Pb wherein M is at least one alkaline earth chosen from barium, calcium and strontium; a lead doped barium oxyorthosilicate; a lead doped calcium oxide; a lead doped calcium sulfide; a lead doped zinc sulfide; a lead doped lanthanum oxide; a lead doped calcium silicate; a lead doped calcium tungstate; a lead doped barium oxyorthosilicate; a lead doped calcium chlorosilicate; a lead doped calcium phosphate; and a lead doped calcium thiogallate.

Doped cesium iodide is doped with Na or Tl.

Rare earth doped pyrosilicate comprises a rare earth dopant Ce, Sm, Tb, Tm, Eu, Yb or Pr.

The nanophosphate may be a host lattice lutetium oxyorthosilicate (LSO), gadolinium oxyorthosilicate (GSO), yttrium oxyorthosilicate (YSO) lutetium yttrium oxyorthosilicate (LYSO) gadolinium yttrium oxyorthosilicate (GYSO) lutetium gadolinium oxyorthosilicate (LGSO) or lanthanum halide.

Lanthanide halide may be of the formula $CeX_3$, wherein X is at least one halide selected from fluoride, chloride, bromide and iodide.

The effective density of the novel composition scintillator may be adjusted by altering the amount of the nanophosphor used. Embodiments may include an amount of nanophosphor of about 65% by volume or less.

Nanophosphors used with the present invention typically have a particle size of substantially equal to or less than about 100 nm, preferably less than about 50 nm and more preferably substantially equal to or less than about 20 nm. In certain embodiments a particle size of less than about 10 nm, or even less than about 5 nm may be utilized. It is noted, for example, that nanopowder with a 5 nm particle size, and for 600 nm photon wavelengths, the optical attenuation length is approximately 20 cm. As is well known in the art, the attenuation length is the distance through which the incident light intensity will be reduced to 1/e or 37% of the initial value. The attenuation length takes into account both optical absorption and scattering losses. The closer the index of refraction between the phosphor and the liquid matrix, the larger the attenuation length. When the indices are exactly or substantially matched, attenuation from optical scattering will become negligible.

Nanoparticles with mean particle sizes below 10 nm may be prepared using a variety of chemical and physical methods that include, but are not limited to single source precursor, hydrothermal, spray pyrolysis or solution combustion methods. These methods are well known in the art.

Nanoparticles may also be prepared by slurry ball milling of bulk scintillator powder, wherein the scintillator powder is milled in a solvent, and then centrifuging or sedimentation is used to isolate the desired fraction of nanoparticles. Mechanical processing of microsized powder using a process known in the art as bead milling has also been shown to produce particles having size less than or equal to 20 nm.

The nanophosphor particles used in the present invention may be surface modified to achieve proper nanophosphor dispersion in the liquid, by functionalizing the particles to provide a neutral surface. The surface modification is preferably accomplished by capping the nanophosphor particle with an organic ligand.

Organic ligands, or surfactant molecules, typically consist of a polar end, usually a carboxylic acid group and a nonpolar tail. Suitable organic ligands are limited only by their coordination ability through either covalent, hydrogen-bonding, coordination bonding, or electrostatic interactions. Coordination ligands may include compounds such as phosphates, phosphonates, phosphine oxides, carboxylic acids and amines. Electrostatic ligands include ammonium and phosphonium cations, and alkoxide anions. Covalent ligands include alkoxides and alkyl thiolates. Hydrogen bonding ligands include carboxylic acids, amines, amides, thiols and phosphates. Illustrative capping agents include oleic acid, lauric acid, diethylhexylphosphoric acid and tri-n-octyl phosphine oxide. The ligands essentially form a 'ligand shell' around the nanophosphor particle, isolating the charged surface, and thereby preventing agglomeration of the nanophosphor particles.

Once capped, the surface modified nanophosphor particle may be mixed with a suitable liquid matrix. The resulting nanophosphor scintillating liquid can be used in conventional liquid scintillator applications. For example, it may be used in a method for detecting radiation by exposing the nanophosphor scintillating liquid to a radiation source and detecting luminescence from the nanophosphor scintillating liquid. The nanophosphor scintillating liquid may also be used in a radiation detector including the nanophosphor scintillating liquid and a photodetector optically coupled to the liquid.

EXAMPLES

Example 1

A toluene scintillator solution was prepared by adding 20 mg of POPOP to 20 ml of toluene and stirring for 5 min. Into this mixture 150 mg of PPO was added and mixed vigourously using an ultrasonic mixer for 1 hr. at room temperature. 6.0 g of 8 nm diameter $CeF_3$ nanopowder/OA gel (80:20) was dispersed in 20 ml of chloroform by vigorous shaking for 30 min. The resulting dispersion was precipitated by addition of 25 ml of methanol and the mixture was centrifuged (3,000 rpm) for 15 min. After decanting the supernatant liquid, the nanopowder was redispersed in 20 ml of the toluene scintillator solution by vigorous shaking for 30 min. The resulting energy resolution for 662 keV gamma rays under $^{137}Cs$ excitation was 20%

Example 2

500 g of 2 nm diameter $LaBr_3$ nanopowder doped with 2 at. % Ce/OA gel (80:20) is dispersed in 2.5 L of commercial liquid scintillator (EJ-321L, NE-235L or BC-517L) by vigorous stirring for 3 hrs.

Example 3

500 g of 10 nm diameter $Gd_2SiO_5$ nanopowder doped with 1 at. % C/OA gel (80:20) is dispersed in 2.5 L of chloroform and vigorously stirred for 3 hrs. The resulting dispersion is precipitated by addition of 2.5 L of methanol and the mixture is centrifuged in 500 ml batches (3,000 rpm) for 15 min each. After the supernatent is decanted the nanopowder is redispersed in 2.5 L of ethanol to which 250 g of sodium phenoxide trihydrate is added and the resulting mixture is stirred and heated at 75° C. for 1 hr and then the mixture is centrifuged in 500 ml batches (3,000 rpm) for 15 min each. After decantation of the supernatent liquid, the resulting functionalized nanophosphor gel is dispersed in 2.5 L of commercial liquid scintillator (EJ-331, NE-323 or BC-521) by vigorous stirring for 3 hrs.

Example 4

10.2 g of 2 nm diameter $LaBr_3$ nanopowder, doped with 2 at. % Ce/DEHPA (80:20) is photochemically produced in 25 L of hexane. Sequential rotary evaporation of the mixture to a final volume of 5 ml yields a liquid scintillator loaded at 40 vol % nanophosphor.

Having described the invention in detail, those skilled in the art will appreciate that modifications may be made of the invention without departing from its' spirit and scope. Therefore, it is not intended that the scope of the invention be limited to the specific embodiments described. Rather, it is intended that the appended claims and their equivalents determine the scope of the invention.

The invention claimed is:

1. A nanophosphor composite scintillator of nanophosphor scintillator particles in a liquid matrix, comprising:
   a liquid matrix; and
   nanophosphor scintillator particles selected from the group consisting of yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide, the nanophosphor particles being surface modified by functionalizing the particles to provide a neutral surface.

2. The composition of claim 1 wherein the metal tungstate comprises lead tungstate, zinc tungstate, calcium tungstate, magnesium tungstate or cadmium tungstate.

3. The composition of claim 1 wherein said cerium doped nanophosphor is a cerium doped oxyorthosilicate of the formula $LAX_3$:Ce wherein X is at least one halide; a cerium doped lanthanum halosilicate of a formula $LaSiO_3$:Ce wherein X is at least one halide; an alkaline earth fluoride of a formula $MF_2$:Ce wherein M is at least one alkaline earth metal selected from the group consisting of barium, calcium, strontium and magnesium; an alkaline earth sulfate of a formula $MSO_4$:Ce wherein M is at least one alkaline earth chosen from barium, calcium, and strontium; an alkaline earth thiogallate of a formula $MGa_2S_4$:Ce wherein M is at least one alkaline earth chosen from barium, calcium, strontium and magnesium; alkaline earth aluminates of a formula $LMAl_{10}O_{17}$:Ce and $CeLMAl_{11}O_{18}$:Ce wherein L, M are at least two alkaline earth metal chosen from barium, calcium, strontium and magnesium; alkaline earth pyrosilicates of a formula $L_2MSi2O_7$:Ce wherein L, M are at least two alkaline earth chosen from calcium, and magnesium; a cerium doped metal aluminum perovskite $MAlO_3$:Ce wherein M is at least one metal chosen from yttrium and lutetium; a cerium doped alkaline earth sulphide of formula MS:Ce wherein M is at least one alkaline earth chosen from strontium and magnesium; a cerium doped yttrium borate; a cerium doped yttrium aluminum borate; a cerium doped yttrium aluminum garnet; a cerium doped yttrium oxychloride; a cerium doped calcium silicate; a cerium doped calcium aluminum silicate; a cerium dopedyttirum phosphate; a cerium doped calcium aluminate; a cerium doped calcium pyroaluminate; a cerium doped calcium phosphate; a cerium doped calcium pyrophosphate; or a cerium doped lanthanum phosphate.

4. The composition of claim 1 wherein the bismuth doped nanophosphor comprises a host lattice selected from the group consisting of an alkaline earth phosphate of a formula $LM_2(P)_4)_2$:Bi wherein M is at least one alkaline earth chosen from barium, calcium and strontium; a lanthanide metal oxide of a formula $M_2O_3$:Bi wherein M is at least one metal chosen from yttrium and lanthanum; a bismuth doped yttrium aluminum borate; a bismuth doped lanthanum oxychloride; a bismuth doped zinc oxide; a bismuth doped calcium oxide; a bismuth doped calcium titanium aluminate; a bismuth doped calcium sulphide; a bismuth doped strontium sulphate; or a bismuth doped gadolinium niobate.

5. The composition of claim 1 wherein the lead doped nanophosphor is chosen from alkaline earth sulfates of formula $MSO_4$:Pb wherein M is at least one alkaline earth chosen from calcium and magnesium; alkaline earth borates of formula $MB_4O_7$:Pb and $MB_2O_4$:Pb wherein M is at least one alkaline earth chosen from calcium and strontium; an alkaline earth chloroborate of a formula $M_2B_5O_9Cl$:Pb wherein M is at least one alkaline earth chosen from barium, calcium and strontium; a lead doped barium oxyorthosilicate; a lead doped calcium oxide; a leaddoped calcium sulfide; a lead doped zinc sulfide; a lead doped lanthanum oxide; a lead doped calcium silicate; a lead doped calcium tungstate; a lead doped barium oxyorthosilicate; a lead doped calcium chlorosilicate; a lead doped calcium phosphate; a lead doped calcium thiogallate.

6. The composition of claim 1 wherein the doped cesium iodide comprises a dopant selected from the group consisting of Na and Tl.

7. The composition of claim 1 wherein said rare earth doped pyrosilicate comprises a rare earth dopant chosen from Ce, Sm, Tb, Tm, Lu, Yb and Pr.

8. The composition of claim 1 wherein said nanopowder phosphor comprises a host lattice chosen from lutetium oxyorthosilicate (LSO), gadolinium oxyorthosilicate (GSO), yttrium oxyorthosilicate(YSO) lutetium yttrium oxyorthosilicate (LYSO) gadolinium yttrium oxyorthosilicate (GYSO) lutetium gadolinium oxyorthosilicate (LGSO) and lanthanum halide.

9. The composition of claim 1 wherein the lanthanide halide is of a formula $CeX_3$ wherein X is at least one halide chosen from fluoride, chloride, bromide and iodide.

10. The composition of claim 1 wherein the liquid matrix is a scintillating liquid matrix selected from the group consisting of benzene, toluene, xylene analogs, deuterated analogs, mineral oil, halogenated solvents, and mixtures thereof.

11. The composition of claim 1 wherein the liquid matrix is a non- scintillating liquid matrix selected from the group including linear alkanes, cyclic alkanes, linear alkenes, cyclic alkenes, ethers, halogenated solvents, alcohols, phenols, amines, and mixtures thereof.

12. The composition of claim 1 wherein the nanophosphor particles comprise a surface modified nanophosphor capped with an organic ligand.

13. The composition of claim 12 wherein the organic ligand includes a compound selected from the group consisting of phosphates, phosphonates, phosphine oxides, carboxylic acids, amines, ammonium cations, phosphonium cations, alkoxide anions, alkoxides, alkyl thiolates, carboxylic acids, amines, amides, thiols and phosphates.

14. A radiation detection method comprising:
 exposing a nanophosphor scintillator liquid to a radiation source, the nanophosphor scintillator liquid including:
 a liquid matrix; and
 at least one nanopowder phosphor selected from the group including yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide, the at least one nanophosphor particle being surface modified by functionalizing the particle to provide a neutral surface; and
 detecting luminescence from the nanophosphor scintillator liquid.

15. The method of claim 14 wherein the liquid matrix is a scintillating liquid matrix selected from the group consisting of benzene, toluene, xylene analogs, deuterated analogs, mineral oil, halogenated solvents, and mixtures thereof.

16. The method of claim 14 wherein the liquid matrix is a non- scintillating liquid matrix selected from the group including linear alkanes, cyclic alkanes, linear alkenes, cyclic alkenes, ethers, halogenated solvents, alcohols, phenols, amines, and mixtures thereof.

17. The method of claim 14 wherein the nanopowder phosphor comprises a surface modified nanophosphor capped with an organic ligand.

18. The method of claim 17 wherein the organic ligand is selected from the group consisting of phosphates, phosphonates, phosphine oxides, carboxylic acids, amines, ammonium cations, phosphonium cations, alkoxide anions, alkoxides, alkyl thiolates carboxylic acids, amines, amides, thiols and phosphates.

19. A radiation detector having a nanophosphor composite scintillator of nanophosphor scintillator particles in a liquid matrix, comprising:
 a nanophosphor scintillator liquid including:
 a liquid matrix; and
 nanophosphor scintillator particles selected from the group including yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide, the at least one nanophosphor particle being surface modified by functionalizing the particle to provide a neutral surface; and
 a photodetector optically coupled to the nanophosphor scintillator liquid.

20. The detector of claim 19 wherein the liquid matrix is a scintillating liquid matrix selected from the group consisting of benzene, toluene, xylene analogs, deuterated analogs, mineral oil, halogenated solvents, and mixtures thereof.

21. The detector of claim 19 wherein the liquid matrix is a non-scintillating liquid matrix selected from the group including linear alkanes, cyclic alkanes, linear alkenes, cyclic alkenes, ethers, halogenated solvents, alcohols, phenols, amines, and mixtures thereof.

22. The detector of claim 19 wherein the nanophosphor particles comprise surface modified nanophosphor particles capped with an organic ligand.

23. The detector of claim 22 wherein the organic ligand is selected from the group consisting of phosphates, phosphonates, phosphine oxides, carboxylic acids, amines, ammonium cations, phosphonium cations, alkoxide anions, alkoxides, alkyl thiolates, carboxylic acids, amines, amides, thiols and phosphates.

* * * * *